United States Patent [19]
Stojkovic et al.

[11] Patent Number: 6,030,017
[45] Date of Patent: Feb. 29, 2000

[54] BODY MOUNTED ISOLATOR WITH LOCKING FEATURE

[75] Inventors: Zlatko B. Stojkovic, Brownstown; Joseph J. Savalle, South Lyon; Stephen J. Lewis, Harrison Township; Mark F. Jacoby, Waterford; Thomas Weber, Birmingham, all of Mich.

[73] Assignees: DaimlerChrysler Corporation, Auburn Hills; Trelleborg YSH, Inc., South Haven, both of Mich.

[21] Appl. No.: 09/344,255

[22] Filed: Jun. 25, 1999

[51] Int. Cl.⁷ ..................................................... B62D 24/02
[52] U.S. Cl. .............................................................. 296/35.1
[58] Field of Search .............................................. 296/35.1

[56] References Cited

U.S. PATENT DOCUMENTS

| | | | |
|---|---|---|---|
| 3,218,101 | 11/1965 | Adams | 296/35.1 |
| 3,622,194 | 11/1971 | Bryk | 296/35.1 |
| 3,809,427 | 5/1974 | Bennett | 296/35.1 |
| 4,465,312 | 8/1984 | Werner . | |
| 4,783,039 | 11/1988 | Peterson et al. | 296/35.1 |
| 4,810,003 | 3/1989 | Pinch et al. . | |
| 4,921,203 | 5/1990 | Peterson et al. | 296/35.1 |
| 4,958,849 | 9/1990 | Pinch et al. . | |
| 5,090,105 | 2/1992 | DeRees . | |
| 5,127,698 | 7/1992 | Konig | 296/35.1 |
| 5,248,134 | 9/1993 | Ferguson et al. . | |
| 5,261,650 | 11/1993 | Hein . | |
| 5,308,048 | 5/1994 | Weaver et al. . | |
| 5,362,035 | 11/1994 | Carter . | |
| 5,544,714 | 8/1996 | May et al. . | |
| 5,579,663 | 12/1996 | Likich et al. . | |
| 5,628,388 | 5/1997 | Angermann . | |
| 5,636,831 | 6/1997 | Gubitz . | |
| 5,641,152 | 6/1997 | Angles et al. . | |
| 5,660,415 | 8/1997 | Redman et al. . | |
| 5,735,565 | 4/1998 | Papai et al. . | |
| 5,788,262 | 8/1998 | Dazy et al. . | |

*Primary Examiner*—Gary C. Hoge
*Attorney, Agent, or Firm*—Roland A. Fuller III

[57] ABSTRACT

The present invention provides a device for attaching a first member to a second member which allows relative movement therebetween for positioning of the first member with respect to the second member. The present invention provides a cylindrical section having a first diameter at a first end expanding therefrom to a second diameter at a second end. A first elastic insulator surrounds the cylindrical section and laterally affixes it to the second member. The first elastic insulator is positioned between the bottom side of the first member and the top side of the second member for absorbing shock therebetween. A clip section inserted into and lockingly engaged to an internal bore of the cylindrical section. The clip section has a width to allow it to move laterally with respect to the first elastic insulator and the cylindrical section for aligning the first member and the second member. A second elastic insulator is positioned around and affixed to the clip section. The first side of the elastic insulator is positioned flush against the bottom side of the second member for absorbing shock in a direction opposite that of the first elastic insulator.

14 Claims, 1 Drawing Sheet

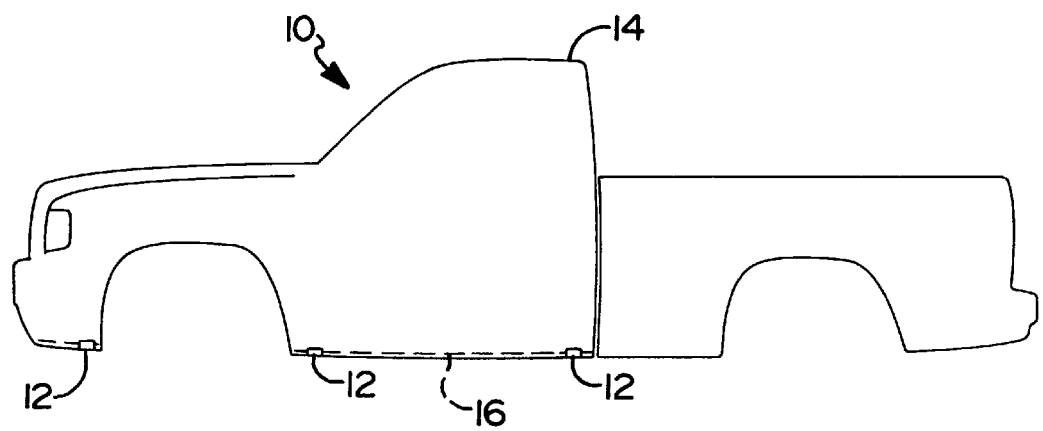
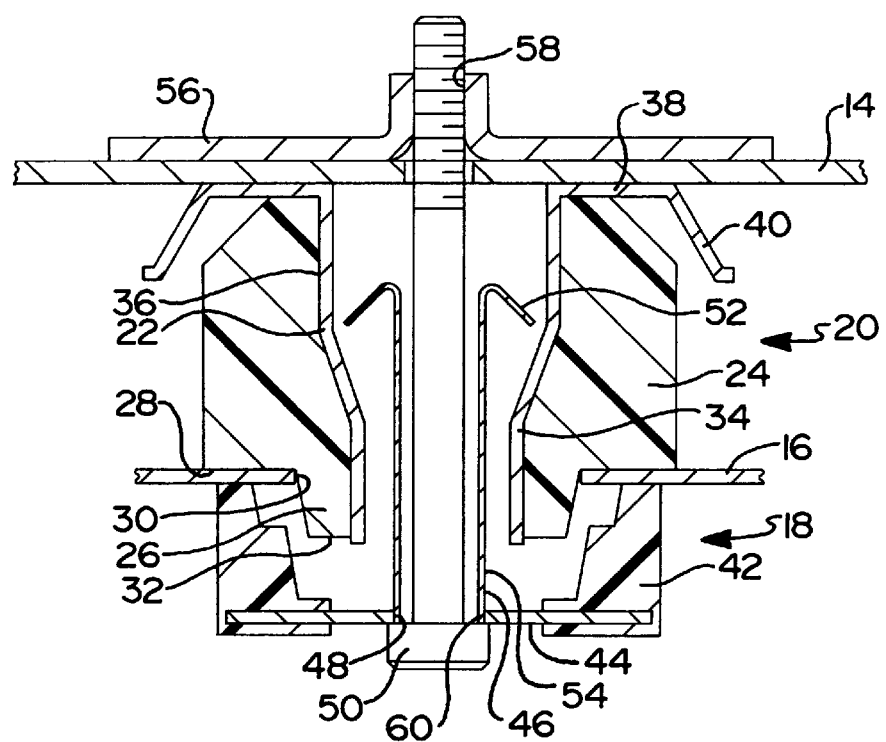

BODY MOUNTED ISOLATOR WITH LOCKING FEATURE

BACKGROUND OF THE INVENTION

TECHNICAL FIELD

The present invention relates generally to a vibration reducing apparatus for use in a vehicle, and more particularly, to an apparatus which reduces transmission of vibration to a body from a chassis and facilitates the assembly of the body onto the chassis.

DISCUSSION

In the assembly of one element to another, such as a vehicle body to a chassis, the mounts which attaches the elements together typically has vibration absorbing characteristics. For instance, in a vehicle such as a truck, a body or cab is mounted on and supported by the vehicle's chassis. The chassis, in turn, is supported by the vehicle's wheels. As such, the vibration from the road, over which the vehicle's wheels roll, is transmitted directly to the chassis. The chassis, in turn, transmits this vibration to the body or cab through the mounts. As such, the sound absorbing characteristics of these mounts absorb this vibration to enhance the comfort of the vehicle driver located within the cab. The mounts, themselves, typically have a bolt or shaft with a vibration absorbing isolator positioned therearound. The bolt passes through the isolator and into a tapping plate, connected in the cab. The bushing is positioned between the body and chassis to absorb vibration therebetween. However, this type of assembly has some drawbacks.

Because the bolt must be inserted through the isolator, chassis, and cab, the body or cab and chassis must be properly aligned before assembly can occur. This alignment requires precision positioning of the bulky body or cab on the large chassis assembly. Positioning of this type requires time and requires specific tooling. In manufacturing terms, this equates to increased cost. The present invention was developed in light of this drawback.

SUMMARY OF THE INVENTION

The present invention overcomes the aforementioned drawbacks, among others, by providing a device for attaching a first member to a second member which allows relative lateral movement therebetween for positioning of the first member with respect to the second member. The present invention provides a cylindrical section having a first diameter at a first end expanding therefrom to a second diameter at a second end. A first elastic insulator surrounds the cylindrical section and laterally affixes it to the second member. The first elastic insulator is positioned between the bottom side of the first member and the top side of the second member for absorbing shock therebetween. A clip section is inserted into and lockingly engaged to an internal bore of the cylindrical section. The clip section has a width to allow it to move laterally and vertical with respect to the first elastic insulator and the cylindrical section for aligning the first member and the second member. A second elastic insulator is positioned around and affixed to the clip section. The first side of the elastic insulator is positioned flush against the bottom side of the second member for absorbing shock in a direction opposite that of the first elastic insulator.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 1 is a cross-sectional view of a vehicle using a body mount isolator according to the present invention; and FIG. 2 is a cross-sectional view of a body mount isolator according to the present invention.

DETAILED DESCRIPTION OF THE PREFERRED EMBODIMENTS

The following description of the preferred embodiments is merely exemplary in nature and is in no way intended to limit the invention, its application, or uses.

Referring now to FIG. 1, a vehicle 10 is shown having a cab 14 in conjunction with a chassis 16. The cab 14 is positioned on top of the chassis 16 and is connected thereto by a plurality of body mount isolators 12. As is understood in the art, chassis 16 carries and provides support to cab 14.

Referring now to FIG. 2, the body mount isolator 12 is shown in greater detail. Body mount isolator 12 is shown generally having rebound cushion assembly 18 and isolator assembly 20. Isolator assembly 20 has a cylinder 22 surrounded by and attached to a elastic insulator 24. The elastic insulator 24 is preferably some form of a vibration and noise absorbing material such as rubber. Elastic insulator 24 has a cylindrical section 26 which extends downwardly from face 28 of elastic insulator 24. The portion of cylindrical section 26 proximately located to face 28 has an outside diameter corresponding to the diameter of bore 30 in chassis 16. As such, cylindrical section 26 cooperates with bore 30 to maintain isolator assembly 20 in a fixed lateral position with chassis 16.

Cylindrical section 26 extends downwardly away from face 28 toward end 32 and tapers inwardly toward cylinder 22 thereby defining a diameter at end 32. The diameter defined at end 32 is smaller than that associated with the portion of cylindrical section 26 proximately located to face 28. As such, cylindrical section 26 may easily be inserted into bore 30 for ease of assembly as will be discussed.

Cylinder 22 has a first diameter at portion 34 and tapers outwardly to a second diameter at second portion 36. Second portion 36 extends outwardly at cab 14, thereby forming a surface 38 positioned flush against cab 14. Surface 38 extends downwardly at portion 40. Second portion 36, surface 38, and portion 40 define a horseshoe shape which contains and supports elastic insulator 24.

Rebound cushion assembly 18 generally comprises a second elastic insulator 42, disc portion 44, and clip 46. Similar to elastic insulator 24, second elastic insulator 42 is constructed of a sound and vibration absorbing material such as rubber. Second elastic insulator 42 is bonded to or attached to washer 44 at a first end and is positioned flush against chassis 16 at a second end. Unlike elastic insulator 24, second elastic insulator 42 is not affixed laterally to chassis 16.

Disc portion 44 has an internal bore 48 from which clip 46 extends upward into cylinder 22. Clip 46 extends along threaded member 50 until turning downward at tails 52.

Tails 52 extend downward and outwardly defining an outer diameter. This outer diameter is greater than the diameter associated with portion 34, yet smaller than the diameter associated with second portion 36. Portion 54 of clip 46 has an outer diameter smaller than portion 34 to define a gap therebetween. As such, if threaded member 50 has not been inserted into isolator assembly 20, then rebound cushion assembly 18 is free to move laterally cross car with respect to isolator assembly 20 and chassis 16.

Threaded member 50 threads into fixed tapping plate 56 which is positioned on the opposite side of cab 14 from body mount isolator 12. Threaded member 50 acts to position rebound cushion assembly 18 laterally and cross car and isolator assembly 20 is positioned laterally and cross car by bore 30 of chassis 16.

With continued reference to FIG. 2, the assembly and operation of the present invention will now be described. To assemble, the cylindrical section 26 of isolator assembly 20 is first inserted into bore 30 of chassis 16. This serves to laterally and cross car affix isolator assembly 20 with chassis 16. Next, clip 46 is inserted through portion 34 of cylinder 22. The smaller diameter of portion 34 presses against tails 52 of clip 46, thereby bending clip 46 inwardly. Once tails 52 move past portion 34, tails 52 are allowed to expand within the diameter of second portion 36. Once there, tails 52 maintain rebound cushion assembly 18 in the vertical position as shown by interfering with the chamfer between portions 34 and 36. Next, cab 14 and fixed tapping plate 56 are layered upon surface 38. Bore 58 is roughly positioned with the bore located within disc portion 44. Threaded member 50 is then inserted into bore 60. Rebound cushion assembly is then moved laterally until threaded member 50 can be aligned with bore 58. When alignment is achieved, threaded member 50 is screwed into bore 58 of fixed tapping plate 56. Tightening of threaded member 50 then presses rebound cushion assembly 18 against chassis 16, and compresses isolator assembly 20 between chassis 16 and cab 14. It is noted that a variety of other types of fastening devices may be used instead of threaded member 50 and the present invention is not limited to that disclosed herein.

In operation, vibration and movement transmitted from the road to chassis 16 is dampened or reduced to minimize its transfer to cab 14. Upward movements of chassis 16 cause compression of isolator assembly 20, thereby absorbing upward motion. Likewise, downward movement of chassis 16 compresses rebound cushion assembly 18 between disc portion 44, affixed to cab 14 by threaded member 50, and chassis 16. This, as a result, absorbs downward movement by chassis 16.

While the above detailed description describes the preferred embodiment of the invention, it should be understood that the present invention is susceptible to modification, variation, and alteration without deviating from the scope and fair meaning of following claims.

What is claimed is:

1. A device for attaching a first member to a second member, said device comprising:
    a cylindrical section having a first end and a second end, said cylindrical section having a first diameter at said first end expanding therefrom to a second diameter at said second end;
    a first elastic insulator surrounding said cylindrical section, said first elastic insulator laterally and cross car affixed to said second member, said first elastic insulator further positioned between a bottom side of said first member and a top side of said second member for absorbing shock therebetween;
    a clip section inserted into and lockingly engaged to an internal bore of said cylindrical section, said clip section having a width to allow said clip section to move laterally with respect to said first elastic insulator and said cylindrical section for aligning said first member and said second member; and
    a second elastic insulator positioned around and affixed to said clip section, said second elastic insulator having a first side opposite a second side, said first side positioned flush against a bottom side of said second member for absorbing shock in a direction opposite that of said first elastic insulator.

2. A device as claimed in claim 1, wherein said clip section includes a pair of spring segments extending along an axis defined by said cylindrical section, said pair of spring segments having angled portions extending outwardly from and back along said axis, said angled portions adapted to maintain said clip section lockingly engaged to said internal bore of said cylindrical section.

3. A device as claimed in claim 1, further comprising a disc portion outwardly extending from said clip section, said disc portion affixed to an end of said clip section distally located from said first member.

4. A device as claimed in claim 3, wherein said second side of said second elastic insulator is positioned flush against said disc portion.

5. A device as claimed in claim 3, further comprising a second disc portion extending outwardly from said cylindrical section, said second disc portion affixed to an end of said cylindrical section distally located from said disc portion.

6. A device as claimed in claim 5, wherein said first elastic insulator is positioned flush against said second disc portion.

7. A device as claimed in claim 1, further comprising said first member and said second member.

8. A device as claimed in claim 7, wherein said first member is a cab of a vehicle and said second member is a chassis.

9. A device as claimed in claim 1, further comprising a threaded fastener inserted into said clip section and threadingly engaged to said first member, whereby said threaded fastener clamps said clip section and said second elastic insulator against said cylindrical section and said first elastic insulator.

10. A device as claimed in claim 9, further comprising a fixed tapping plate flush against said first member on a side opposite said first elastic insulator, said threaded fastener threadingly engaged to said tapping plate for clamping said clip section and said second elastic insulator against said cylindrical section and said first elastic insulator.

11. A device as claimed in claim 1, wherein said first elastic insulator has a face proximate said second member, said first elastic member having a cylindrical section extending from said face and through an aperture in said second member for laterally affixing said first elastic insulator.

12. A device as claimed in claim 1, wherein said first elastic insulator and said second elastic insulator are constructed of rubber.

13. A device for attaching a cab to a chassis of a vehicle, said device comprising:
    said vehicle having said cab and said chassis;
    a cylindrical section having a first end and a second end, said cylindrical section having a first diameter at said first end and expanding to a second diameter at said second end, said cylindrical section having a second disc portion extending outwardly from said cylindrical section, said second disc portion affixed to said second end of said cylindrical section;

a first elastic insulator surrounding said cylindrical section, said first elastic insulator adapted to be engaged to said chassis such that said first elastic insulator is laterally affixed, said first elastic insulator further positioned between a bottom side of said cab and a top side of said chassis for absorbing shock therebetween;

a clip section inserted into and lockingly engaged to an internal bore of said cylindrical section, said clip section having a width to allow said clip section to move laterally with respect to said first elastic insulator and said cylindrical section, said clip section having a disc portion outwardly extending from said clip section, said disc portion affixed to an end of said clip section distally located from said cab, said clip section including a pair of spring segments extending along an axis defined by said cylindrical section, said pair of spring segments having angled portions extending outwardly from and back along said axis, said angled portions located in said second end to lockingly engage said clip section to said internal bore of said cylindrical section; and a second elastic insulator positioned around and affixed to said clip section, said second elastic insulator having at least a first side opposite a second side, said first side positioned flush against a bottom side of said chassis for absorbing shock in a direction opposite that of said first elastic insulator.

14. A method for attaching a cab to a chassis of a vehicle, said method comprising the steps of:

providing an isolator assembly and a rebound cushion;

placing said isolator assembly through an aperture in said chassis;

pressing said rebound cushion into said isolator assembly on a side of said chassis opposite said isolator assembly;

placing said cab on said isolator assembly;

engaging a threaded member through said rebound cushion; adjusting said threaded member laterally and cross car for alignment of said threaded member with an aperture in said cab; and threadingly engaging said threaded member with said aperture.

* * * * *